United States Patent Office 3,207,201
Patented Sept. 21, 1965

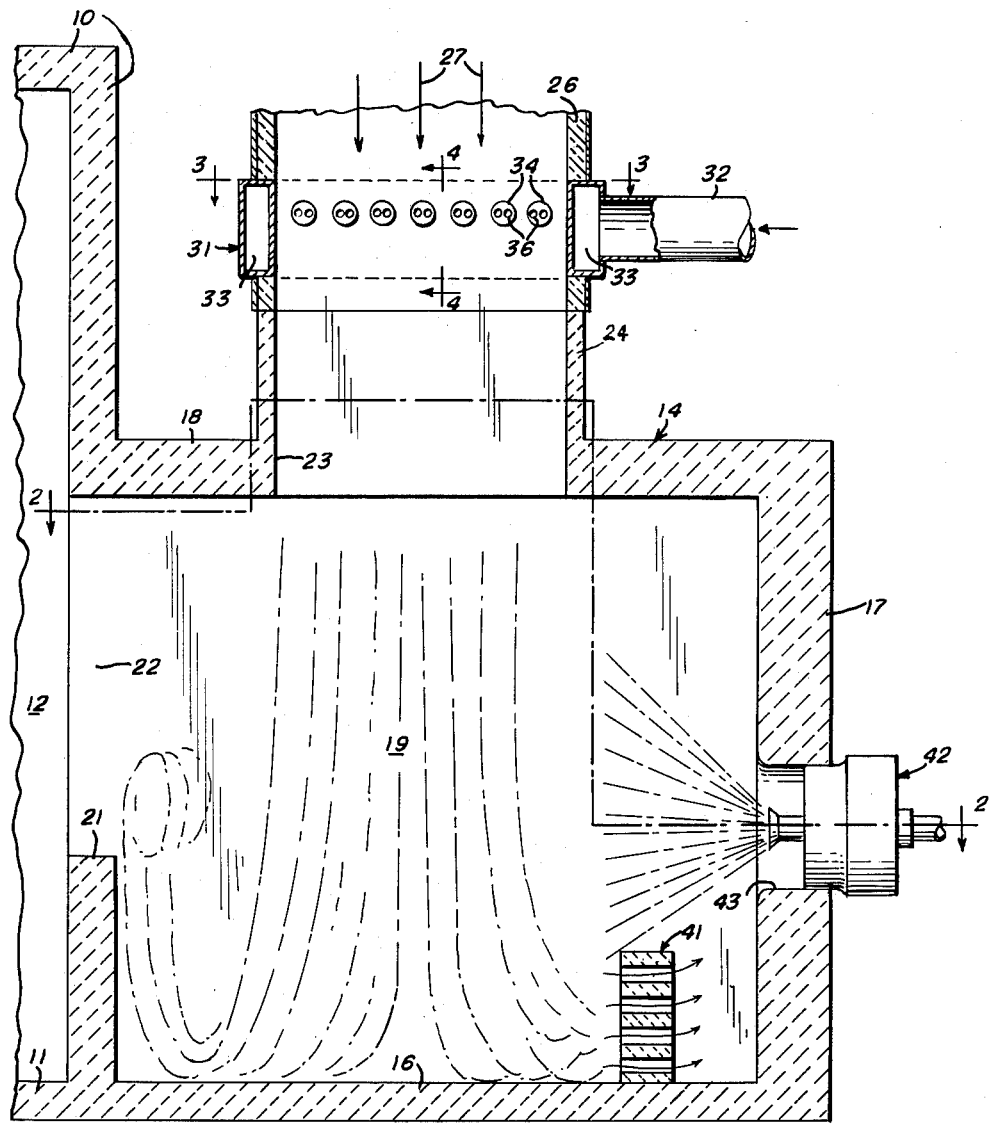
FIG. I

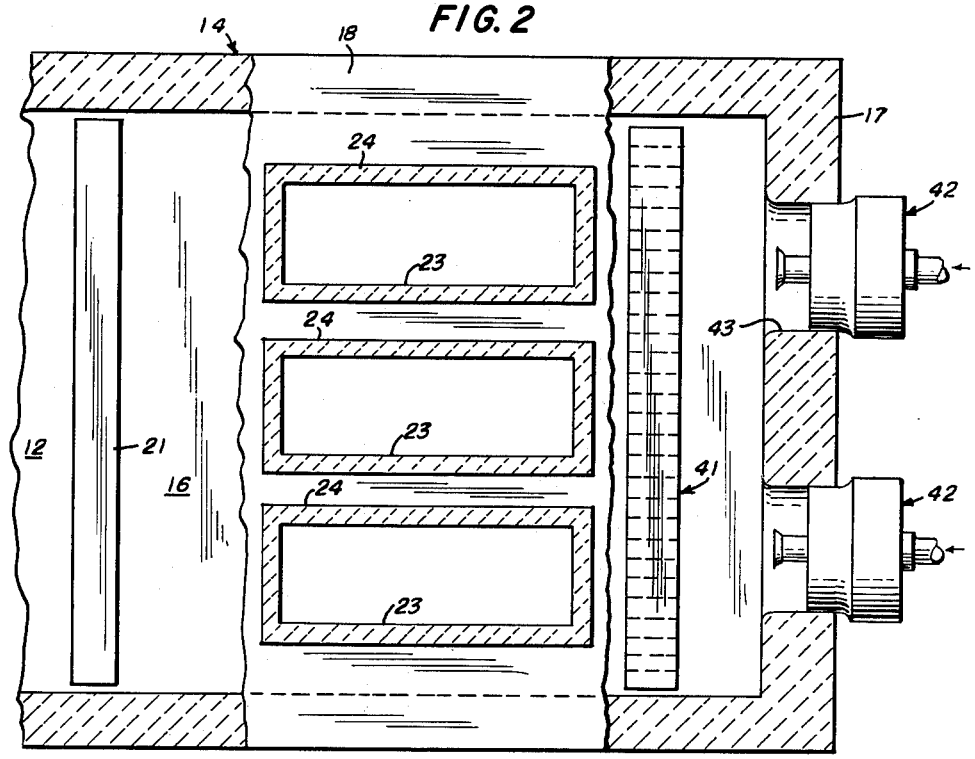
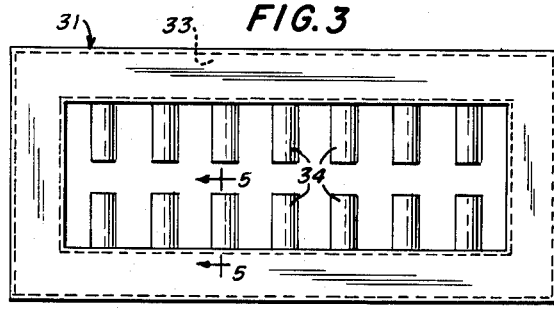
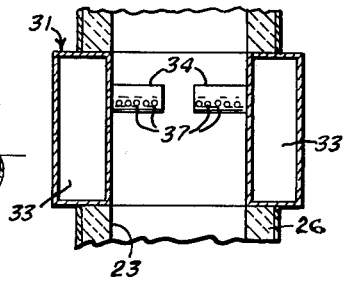
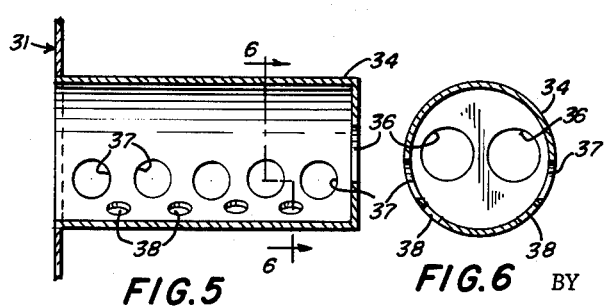

3,207,201
APPARATUS FOR COMBUSTION OF WASTE GASES
John Steele Zink and Robert D. Reed, Tulsa, Okla., assignors to John Zink Company, Tulsa, Okla., a corporation of Delaware
Filed Feb. 6, 1963, Ser. No. 256,651
2 Claims. (Cl. 158—1)

The present invention relates to an assembly for carrying out the combustion of waste gases, such as those released during catalytic refining of petroleum so that the heat developed during such combustion may be employed for useful purposes and at the same time to utilize the sensible heat content of such waste gases and the invention more specifically pertains to apparatus for conditioning and manipulating such gaseous materials so that complete and continuous combustion may be attained and maintained with minimum quantities of auxiliary heat.

Large volumes of gases are released during the refining of petroleum by the catalytic process. These products are often discharged to atmosphere as waste gases. Such gases contain carbon monoxide, methane, traces of oil vapors, nitrogen and water. While the calorific value of the combustible materials of such waste gases is relatively low and in the order of fifteen to thirty British thermal units per cubic foot the temperature of such waste products as they are released is in the range of approximately one thousand degree Fahrenheit. Apparatus is available for partial recovery of the sensible heat but the combustible materials of the waste products are not readily convertible into useful heat because the temperature of the waste gases must be elevated in the presence of oxygen to a level that will enable the combustible materials to burn to completion. The temperature for carrying out such combustion is in the range of about fifteen hundred to eighteen hundred degrees Fahrenheit. Such temperatures are not produced by the combustion of the waste gaseous products so as to maintain continued burning of the combustible materials.

It is an object of the invention to provide apparatus for receiving a mixture of waste gaseous products and air wherein heat is developed by the combustion of a conventional type of fuel for carrying out complete burning of the combustible materials contained in waste gaseous products and to provide apparatus for delivering the heat produced by both combustion processes into a space to be heated.

Another object of the invention is to provide apparatus for mixing air with waste gases and to develop turbulence of the air and gases to provide a combustible mixture of waste gaseous products and air and to supply heat to the mixture in quantities sufficient only for initiating and maintaining combustion of the waste gaseous products.

Another object of the invention is to provide apparatus for mixing air with waste gases in such close proximity to the heating chamber as to avoid access of oxygen to the waste gases for any significant period prior to delivery into the heating chamber to avoid the possibility of conditions promoting explosion of the gaseous mixture.

A more specific object of the invention is to provide apparatus for dispersing air throughout the mass of gaseous materials in quantities sufficient for complete burning of the combustible materials of the waste gaseous products as the stream of waste gas enters the chamber for the combustion of the waste materials and to provide means insuring turbulence and tortuous movements of the mixture within the chamber to which auxiliary heat is supplied whereby the mixture remains in the chamber for periods sufficient to complete the combustion of the combustible contents of the mixture.

Another object of the invention is to provide apparatus for guiding the mixture of air and waste gases downwardly into a chamber wherein heat is developed by the combustion of a conventional fuel to maintain a temperature above that required for kindling and continued rekindling of the combustible materials carried by the waste gases so that the sensible heat contained in the waste products and the heat developed from the combustion thereof may be utilized for useful purposes.

Other objects and features of the invention will be appreciated and become apparent to those skilled in the art to which the invention pertains as the present disclosure proceeds and upon consideration of the accompanying drawings and the following detailed description wherein an embodiment of the invention is disclosed.

In the drawings:

FIG. 1 is a sectional elevational view of apparatus embodying the invention illustrated in relationship with a space to be heated.

FIG. 2 is a sectional plan view taken on the line 2—2 of FIG. 1.

FIG. 3 is an enlarged plan view of a casing and associated elements for dispersing air into one stream of waste gaseous materials and taken on the line 3—3 of FIG. 1.

FIG. 4 is a sectional view taken on the line 4—4 of FIG. 1.

FIG. 5 is a further enlarged sectional view of one of the pipes of the device for dispersing air into the waste gases and taken on the line 5—5 of FIG. 3.

FIG. 6 is a transverse sectional view taken on the line 6—6 of FIG. 5.

The invention is directed to apparatus for conditioning waste gaseous products and delivering heat thereto to provide for substantially complete burning of the combustible materials contained in waste gases whereby the heat resulting from the combustion of the waste products and the alxiliary heat may be employed for useful purposes such as the delivery of heat into a space to be heated. The heat may be utilized for any desired purpose and in the embodiment shown in the drawings walls 10 and a floor 11 in part define a space 12 to be heated. A housing 14 formed of ceramic material is provided exteriorly of the space 12 and the floor 16 may form a continuation of the floor 11. A front wall 17 and a top wall 18 and the floor 16 provide a substantially closed housing forming a chamber 19. A partition wall 21 formed of ceramic material extends vertically from the floor 16 and terminates at a level to provide a relatively large generally rectangular shaped exit opening 22 for the chamber 19 leading into the space 12. The partition wall 21 is desirably of solid construction and devoid of ports therethrough.

The top wall 18 of the housing is provided with a plurality of rectangular shaped openings and in one embodiment as shown in FIG. 2 three of such openings 23 are provided. A relatively short vertically disposed conduit 24 is supported on the top wall 18 and extends thereabove around the opening 23 as shown in FIG. 1. Each of the openings 23 is provided with such a conduit for admitting the waste gaseous materials mixed with air into the chamber 19. A description of one of the devices for mixing air with one stream of waste gaseous materials as the stream approaches the chamber 19 will provide an understanding of the assembly. A rectangular duct 26 is arranged over the conduit 24 and provides means for guiding waste gases such as those released from a refining plant for petroleum for downward movement therein as indicated by the arrows 27 in FIG. 1. Means for dispersing air through the mass of incoming waste gaseous materials is desirably located as close as possible to the chamber 19 in order to avoid the admission of oxygen to the waste gases at a point remote of the chamber 19 and thereby avoid the possibility of auto-ignition of the waste gaseous materials and explosions in the duct system.

The means for dispersing air throughout each stream of the waste gases includes a casing 31 which is substantially of rectangular shape as best shown in FIG. 3 and accommodated in the duct 26. The dimensions of the casing 31 are such that the inner faces thereof are substantially flush with the inner surfaces of the duct 26. Air enters the casing 31 through an inlet pipe 32 at pressure sufficient to fill all portions of the chamber 33 within the casing 31 and to maintain a pressure therein so that air is released as jets through the discharge ports as hereinafter described. A plurality of pipes 34 extend horizontally inwardly from opposite elongated walls of the casing 31. A plurality of discharge openings 36 are provided in the wall otherwise closing the free end of each pipe 34. Additional discharge openings 37 are provided in the periphery of each pipe 34 which have their axes disposed generally in downstream directions. Smaller discharge ports 38 may be formed along the length of each pipe 34 and have their axes disposed generally in vertical directions as shown in FIGS. 5 and 6. Such apparatus functions like a sparger for the distribution of air throughout substantially the entire cubical content of the incoming stream of gases so as to disperse the air and thereby distribute oxygen substantially throughout the mass of waste gases. The jets of escaping air develop turbulence in the waste gases to further promote mixing of air with the waste gaseous products.

A casing 31 for the dispersion of the air throughout the waste gas stream is provided for each conduit 24. Each of the openings 23 is desirably of rectangular shape and there is a sparger for the gas stream entering each of the openings 23. The waste gases mixed with air moves vertically downwardly through an opening 23 into the chamber 19. The mixture impacts the floor 16. A lattice wall 41 is provided within the chamber 19 which extends vertically from the floor 16. The wall 41 is formed of ceramic material such as refractory bricks and has openings therethrough in the range of about forty per cent of a side face area of the wall 41. The openings in the wall 41 allow a portion of the gas and air mixture after impacting the floor 16 to move therethrough as diagrammatically indicated by arrows in FIG. 1.

A plurality of burner assemblies 42 of a conventional type are mounted on the wall 17 and each is mounted within an opening 43. In the embodiment illustrated in the drawings two burners are employed for a chamber equipped with three inlet openings 23. The burner assemblies 42 may be of a known type and serve to provide combustion of a conventional gaseous or liquid fuel and desirably provide a substantially frusto-conical shape pattern as depicted in FIG. 1 flaring outwardly to have a diameter greater than the length of the flame. The burner assemblies 42 in the combustion of a conventional gaseous or liquid fuel provide auxiliary heat within the chamber 19 and a portion of the mixture of air and waste gases particularly that quantity which moves through the openings in the lattice wall 41 is abruptly heated to approximately two thousand degrees Fahrenheit and in a very short interval of time. Such temperature conditions causes the combustible content of the waste gases to burn. The heat developed from the burning of the combustible elements of the waste gases is added to the chamber 19 and the heat developed by the combustion of a conventional fuel by the burner assemblies 42 elevate the temperature of other portions of the waste gases located remotely of the burner assemblies 42 and promote combustion of all of the combustible content of the waste gases. The solid wall 21 serves to intercept some portions of the gases following impact with the floor 16. The wall 21 serves to turn these portions of the mixture upwardly and develop intimate commingling with the flow through the opening 22. This interception of the burning gases moving towards the opening 22 tends to delay movement into the space 12 to be heated. The vertically downward entry of the mixture of waste gases and air and as a consequence of the impacting of the mixture with the bottom wall 16 and the cooperation of the walls 21 and 41 provides flow courses for the mixture which cause the waste gases and air to remain within the chamber 19 for an extended period of time. The waste gases and air mixture remain in the chamber 19 for such a protracted period as to provide sufficient time for completing the combustion of the combustible content of the gases. It has been found that the temperature range of about fifteen hundred to eighteen hundred degrees Fahrenheit is necessary within the chamber 19 in order to insure burning of the combustible elements of the waste gases.

The elongated rectangular cross sectional shape of the openings 23 promote rapid mixing of the waste gases with hot products developed by the burning of a conventional fuel. This type of entrance opening exposes greater external areas of the streams of waste gases to the hot products of combustion developed by the burner assemblies 42 than would be the case if the external areas of the streams were through a circular or a generally square shaped inlet opening. The enhanced exposure reduces the time for the elevation of the temperature of the mixture to accelerate burning of the combustibles of the waste gases. The heat developed by the burning of the combustible products of the waste gases plus the sensible heat and the heat developed by the burner assemblies 42 is utilized for heating the space 12. The assembly provides the result of heating of the waste gases with quantities of a conventional fuel which heretofore have been regarded as inadequate for burning a given quantity of waste gases. The assembly thus reduces the volume of standard fuel to a minimum while providing for the recovery of heat from the combustibles of the waste gases and the recovery of sensible heat.

While the invention has been shown and described with reference to particular structural elements and one organization it will be appreciated that changes may be made in the overall assembly as well as the components. Such modifications and others may be made without departing from the spirit and scope of the invention as set forth in the appended claims.

What we claim and desire to secure by Letters Patent is:

1. Apparatus for burning combustible components of a gaseous medium having a low heat value comprising in combination, a wall structure having a chamber therein, said wall structure having an inlet opening in the upper portion thereof, conduit means receiving a gaseous medium and guiding it for downward movement through said inlet opening into said chamber, means embracing said conduit means and positioned adjacent said wall structure for dispersing air throughout the gaseous medium as it moves within said conduit means to provide a gaseous mixture, a surface within said chamber confronting the path of movement of said mixture as it enters said chamber against which the mixture impacts diverting it in a plurality of generally lateral directions, burner assembly means for the combustion of conventional fuel mounted on said wall structure directing a heat pattern generally transversely of movement of the mixture entering said chamber, wall means extending upwardly from said surface within said chamber and having openings therethrough for passage of some of the mixture diverted by said surface, said wall means being positioned below the level of said burner assembly and in the vicinity thereof whereby the mixture passing through the openings is heated to a temperature above the kindling temperature of said mixture, partition wall means extending upwardly from said surface within said chamber and positioned to be engaged by other portions of the mixture diverted by said surface, and said wall structure having an exit opening above the partition wall means.

2. Apparatus for burning combustible components of a gaseous medium having a low heat value as set forth in claim 1 wherein said inlet opening is of elongated rectangular shape and the axis of said burner assembly is in a direction which is generally parallel to an elongated dimension of said inlet opening.

References Cited by the Examiner

UNITED STATES PATENTS

| | | | |
|---|---|---|---|
| 738,509 | 9/03 | Wilson | 158—1 |
| 1,441,721 | 1/23 | Caracristi | 122—7 |
| 1,839,515 | 1/32 | Wetherbee | 158—118 |
| 1,896,910 | 2/33 | Merkt | 158—18 X |
| 2,893,333 | 7/59 | Brunes | 122—7 |
| 2,976,855 | 3/61 | Downs | 122—7 |

FOREIGN PATENTS

| | | |
|---|---|---|
| 170,465 | 10/21 | Great Britain. |
| 441,106 | 2/27 | Germany. |

JAMES W. WESTHAVER, *Primary Examiner.*

FREDERICK L. MATTESON, JR., M. PERLIN,
*Examiners.*